(12) United States Patent
Das

(10) Patent No.: US 11,273,842 B2
(45) Date of Patent: Mar. 15, 2022

(54) CONTROL SYSTEM AND IMPROVED CONTROL METHOD FOR THE AUTONOMOUS CONTROL OF A MOTOR VEHICLE

(71) Applicant: TRW Automotive GmbH, Alfdorf (DE)

(72) Inventor: Abhash Das, Duesseldorf (DE)

(73) Assignee: TRW AUTOMOTIVE GMBH, Alfdorf (DE)

( * ) Notice: Subject to any disclaimer, the term of this patent is extended or adjusted under 35 U.S.C. 154(b) by 147 days.

(21) Appl. No.: 16/278,989

(22) Filed: Feb. 19, 2019

(65) Prior Publication Data
US 2019/0283768 A1    Sep. 19, 2019

(30) Foreign Application Priority Data
Mar. 16, 2018   (DE) .......................... 102018002156.5

(51) Int. Cl.
*B60W 50/02*     (2012.01)
*B60W 50/023*    (2012.01)
(Continued)

(52) U.S. Cl.
CPC ...... *B60W 50/0205* (2013.01); *B60W 50/023* (2013.01); *B60W 50/0225* (2013.01);
(Continued)

(58) Field of Classification Search
CPC ................................................ B60W 50/0205
See application file for complete search history.

(56) References Cited

U.S. PATENT DOCUMENTS

| 2012/0089293 A1* | 4/2012 | Halder .............. B60W 50/0205 701/24 |
| 2016/0103450 A1 | 4/2016 | Hogenmueller et al. |

(Continued)

OTHER PUBLICATIONS

Catalog entitled "International Standard ISO 26262-1, article Road vehicles Functional safety" Nov. 15, 2011.

*Primary Examiner* — Alex C Dunn
(74) *Attorney, Agent, or Firm* — Tarolli, Sundheim, Covell & Tummino LLP

(57) ABSTRACT

A control system for the autonomous control of a motor vehicle comprises an environmental sensor system, which is arranged and configured to acquire environmental data for the autonomous control of a motor vehicle. The control system further comprises at least one actuator controller, which is configured to control at least one actuator of the motor vehicle. A first control unit is configured to determine control commands for the at least one actuator controller with the environmental data and to transmit these to the actuator controller. The control system further comprises a control monitoring unit, which is configured to check a functionality of the first control unit with the environmental data and with the control commands transmitted to the actuator controller, wherein the control monitoring unit is further configured to determine emergency control commands for the at least one actuator controller with the environmental data, depending on the checking of the first control unit, and to transmit these emergency control commands to the actuator controller. In this case the at least one actuator controller is further configured to execute the emergency control commands of the control monitoring unit prioritised over the control commands of the first control unit.

10 Claims, 1 Drawing Sheet

(51) Int. Cl.
  *G05D 1/00* (2006.01)
  *B60W 50/04* (2006.01)
(52) U.S. Cl.
  CPC ........... *B60W 50/04* (2013.01); *G05D 1/0077* (2013.01); *G05D 1/0088* (2013.01); *B60W 2050/021* (2013.01)

(56) References Cited

U.S. PATENT DOCUMENTS

| | | | | |
|---|---|---|---|---|
| 2016/0339926 | A1* | 11/2016 | Ballmann | B60W 50/0205 |
| 2017/0225689 | A1* | 8/2017 | Mukai | B60W 10/18 |
| 2018/0237028 | A1* | 8/2018 | Hammerschmidt | B60R 21/01 |
| 2018/0281816 | A1* | 10/2018 | Otsuka | B60W 50/0205 |
| 2019/0248378 | A1* | 8/2019 | Nix | G05D 1/0077 |
| 2019/0278276 | A1* | 9/2019 | Zhang | B60T 7/22 |
| 2019/0291726 | A1* | 9/2019 | Shalev-Shwartz | B60W 50/0097 |
| 2019/0291727 | A1* | 9/2019 | Shalev-Shwartz | B60W 30/0956 |

\* cited by examiner

CONTROL SYSTEM AND IMPROVED CONTROL METHOD FOR THE AUTONOMOUS CONTROL OF A MOTOR VEHICLE

RELATED APPLICATION

This application claims priority from German Application No. 10 2018 002 156.5, filed Mar. 16, 2018, the subject matter of which is incorporated herein by reference in its entirety.

BACKGROUND

An improved control system and an improved control method for the autonomous control of a motor vehicle are disclosed here. The control system and the control method can be used in particular in motor vehicles with complete or partially autonomous control. Details of this are defined in the claims; the description and the drawings also contain relevant information about the system and the mode of operation as well as about variants of the system and the method.

TECHNICAL FIELD

Control systems and control methods for autonomous or self-driving motor vehicles are known. In these cases a motor vehicle is controlled completely or partially by an electronic driving instance and on the basis of environmental data, which is acquired by a sensor system.

Due to the possibly serious consequences in the event of a failure or malfunction of a control system, for example personal injury and/or material damage, special safety precautions should be taken. The extent of the safety precautions to be taken here is governed by the possible consequences of a malfunction or failure of a system component. Thus ISO 26262 ("Road vehicles—Functional safety"), for example, defines so called ASILs ("automotive safety integrity levels"), which define safety and redundancy requirements for automobile technical systems depending on a hazard analysis and risk assessment in the case of a possible malfunction of the respective systems.

A control system for an autonomously driving vehicle has a high ASIL according to ISO 26262, as a failure of this control system, for example, can be accompanied by possibly serious consequences. The implementation of systems with a high ASIL is more complex, however, in particular due to the high redundancy and safety requirements, and is therefore usually more cost-intensive to implement than a control system with a lower ASIL, for example.

UNDERLYING PROBLEM

In spite of existing control systems for the at least partially autonomous operation of motor vehicles, a requirement thus exists for an improved control system, which has a high degree of functional safety and an improved implementation outlay.

PROPOSED SOLUTION

This object is achieved by a control system according to claim 1 and a control method according to claim 10. Advantageous configurations are defined by the dependent claims.

A control system for the autonomous control of a motor vehicle comprises an environmental sensor system, which is arranged and configured to acquire environmental data for the autonomous control of a motor vehicle. The control system further comprises at least one actuator controller, which is configured to control at least one actuator of the motor vehicle. A first control unit is configured to determine control commands for the at least one actuator controller with the environmental data and to transmit these to the at least one actuator controller. The control system further comprises a control monitoring unit, which is configured to check a functionality of the first control unit with the environmental data and with the control commands transmitted to the actuator controller, wherein the control monitoring unit is further configured to determine emergency control commands for the at least one actuator controller with the environmental data depending on the checking the first control unit, and to transmit these emergency control commands to the at least one actuator controller. The at least one actuator controller controls at least one actuator of the motor vehicle, for example a brake actuator, or a plurality of actuators of the motor vehicle. In this case the at least one actuator controller is further configured to execute the emergency control commands of the control monitoring unit prioritised over the control commands of the first control unit.

To determine the control commands and/or the emergency control commands, the first control unit and/or the control monitoring unit can also access vehicle parameters of the motor vehicle, for example a speed, an acceleration or a fuel reserve of the motor vehicle. Other vehicle parameters can be, for example, the external dimensions of the motor vehicle or the charge level of a motor vehicle battery. The vehicle parameters can be acquired respectively using suitable vehicle parameter sensors or, like the external dimensions of the motor vehicle, for example, be stored by a control unit and/or the control monitoring unit of the control system. The vehicle parameter sensors are each configured to transmit the vehicle parameters to a control unit and/or the control monitoring unit of the control system.

The first control unit can be implemented with a comparatively low ASIL, for example an ASIL of A to C, and fully control the motor vehicle normally and in trouble-free operation. The first control unit can, for example, fully control all actuators/functions of the motor vehicle on the one hand and be implemented efficiently, in particular cost-efficiently, on the other hand due to the comparatively low ASIL.

The control monitoring unit can be implemented with a comparatively high ASIL, for example an ASIL of C or D, and check at least a portion of the control commands issued by the first control unit, which are relevant for road-safe operation of the motor vehicle, for their correctness and their plausibility. If the control monitoring unit detects a malfunction of the first control unit, the actuators can be controlled directly by the control monitoring unit. To this end the emergency control commands of the control monitoring unit can overwrite the control commands issued by the first control unit and/or the control monitoring unit can deactivate the first control unit, so that only the emergency control commands are transmitted to the at least one actuator controller.

The control monitoring unit can be configured in particular so that only a safety-relevant portion of a vehicle control is checked and/or controlled by the control monitoring unit. Thus it can be achieved on the one hand that all functions of an at least partially autonomous vehicle control that are directly relevant for travel safety are ensured by a control monitoring unit with a comparatively high ASIL, and on the other hand the control monitoring unit can be implemented efficiently, in particular cost-efficiently, due to a reduced functional scope compared with the first control unit, for example.

The control monitoring unit can have a reduced functional scope compared with the first control unit. For example, in the event of a hazardous traffic situation being detected and/or a malfunction of the environmental sensor system being detected, the first control unit can determine that stopping of the vehicle is necessary. To this end the first control unit can initially cause a change of lane, for example towards a hard shoulder of a multilane motorway that is provided for stopping of a motor vehicle, by transmitting a corresponding control command to an actuator controller, in particular a steering controller. After the lane change has been registered by the environmental sensor system, the first control unit can then bring about the stopping of the vehicle by transmitting a corresponding control command to an actuator controller, in particular a brake controller. If on the other hand the control monitoring unit establishes a failure of the first control unit, for example, this can be configured by way of example only to stop the vehicle directly and to initiate a warning signal for other road users, for example by activating hazard warning lights. To this end the control monitoring unit can transmit an emergency control command to an actuator controller, in particular to the brake controller, wherein the actuator controller is configured to execute the emergency control commands of the control monitoring unit in a prioritised manner.

An advantage of the reduced functional scope of the control monitoring unit as compared to the first control unit is that the control monitoring unit is efficient to implement, in spite of a higher ASIL, wherein at least one controller of the motor vehicle directly relevant for road safety is guaranteed even in the event of a failure or a malfunction of the first control unit.

The control system can further comprise at least a second control unit, which is configured to determine monitoring control commands with the environmental data and/or the vehicle parameters and to compare the monitoring control commands determined with the control commands determined by the first control unit for the at least one actuator controller. If the second control unit establishes a discrepancy between the control commands of the first control unit and the monitoring control commands, then the second control unit can transmit fault information to the control monitoring unit.

One advantage here is that the second control unit can be implemented efficiently with the ASIL of the first control unit or with a lower ASIL than the first control unit, but further increases the functional reliability of the control system. For example, the control monitoring unit can hereby receive fault information that displays a malfunction of the first control unit that is not directly relevant to road safety. Based on this fault information, the control monitoring unit can for example increase an extent and/or an intensity of the checking of the first control unit, for example by shortening intervals at which a check of the first control unit is carried out.

The first control unit can further be configured to compare the control commands determined for the actuator controller with the monitoring control commands determined by the second control unit and to transmit fault information to the control monitoring unit depending on the comparison.

The control monitoring unit can further be configured to check a functionality of the second control unit with the environmental data and with the monitoring control commands and/or, in particular depending on the checking of the second control unit, to deactivate the second control unit.

The control monitoring unit can further be configured to deactivate the first control unit depending on the checking of the first control unit. In addition, the control monitoring unit can further be configured to deactivate the first or the second control unit depending on fault information transmitted by the first or by the second control unit.

One advantage in this case is that the operating safety of the control system can be increased by the reciprocal monitoring of the control units and by the monitoring of the control units by the control monitoring unit.

In a further development, the control system can have a plurality of reciprocally checking control units, which are also checked respectively by the control monitoring unit. The ASIL of the control monitoring unit is the same as or higher than the ASIL of the respective control units in this case.

The first control unit and the second control unit can be logical control units, which are formed physically by a common integrated circuit. In particular, the first and the second control unit can be implemented as logical control units simultaneously by a data processing device.

The control monitoring unit can be logically and physically separated from the first and/or the second control unit. In particular, the control monitoring unit can be implemented with an integrated circuit that is physically completely separate from the control units, which circuit can also have its own energy supply, for example.

An advantage in this case is that the control monitoring unit can transmit at least emergency control commands that are directly relevant for road safety to an actuator controller of the vehicle, even in the event of a complete failure of the energy supply of all control units.

In a further development, the second control unit can further be configured to use a first portion of the environmental data, which is used by the first control unit to determine the control commands, to determine the monitoring control commands and to estimate by a numerical estimation method a second portion of the environmental data, which is used by the first control unit to determine the control commands, for determining the monitoring control commands.

Furthermore, the control monitoring unit can be further configured to use a first portion of the environmental data, which is used by the first control unit to determine the control commands, to determine the emergency control commands and to estimate by a numerical estimation method a second portion of the environmental data, which is used by the first control unit to determine the control commands, for determining the emergency control commands.

An advantage in this case is that, for example, the recognition of a defect in a part of the environmental sensor system can be improved by the second control unit and/or the control monitoring unit. Furthermore, even parameters that are not directly acquired by the environmental sensor system of the motor vehicle can be estimated by the second control unit and/or the control monitoring unit. Checking of the first control unit can be improved by this.

Another advantage is that, for example, the control monitoring unit can still determine the emergency control commands even when a part of the environmental sensor system is affected by a malfunction or a failure, for example a failure of the energy supply.

In a further development, at least the control monitoring unit and the first part of the environmental sensor system can each have an emergency power battery, which facilitates at least temporary further operation during a failure of the energy supply of the vehicle.

A control method for the autonomous control of a motor vehicle comprises the steps:
- acquisition of environmental data by an environmental sensor system;
- determination of control commands for at least one actuator controller by a first control unit, wherein the first control unit uses acquired environmental data for this;
- transmission of the control commands to the at least one actuator controller;
- checking of the first control unit by a control monitoring unit, wherein the control monitoring unit uses the determined control commands and acquired environmental data for this;
- determination, depending on the checking of the first control unit, of emergency control commands by the control monitoring unit, wherein the control monitoring unit uses acquired environmental data for this;
- transmission, depending on the checking of the first control unit, of the emergency control commands to the at least one actuator controller;
- control of an actuator by the at least one actuator controller, wherein the at least one actuator controller is configured to execute the emergency control commands of the control monitoring unit prioritised over the control commands of the first control unit.

BRIEF DESCRIPTION OF DRAWING

Further aims, features, advantages and application options result from the following description of exemplary embodiments, which are to be understood as non-restrictive, with reference to the associated drawings. Here all features described and/or depicted show by themselves or in any combination the subject matter disclosed here, even independently of their grouping in the claims or their back-references. The dimensions and proportions of the components shown in the figures are not to scale here; they may deviate from what is shown here in embodiments to be implemented.

DETAILED DESCRIPTION OF DRAWINGS

Comparable components and features, and components and features that are identical and have the same effect, are provided with the same reference signs in the figures. The components and features, which are not described afresh in relation to the other figures, are similar in their configuration and function to the corresponding components and features according to the other figures.

Figure 1:
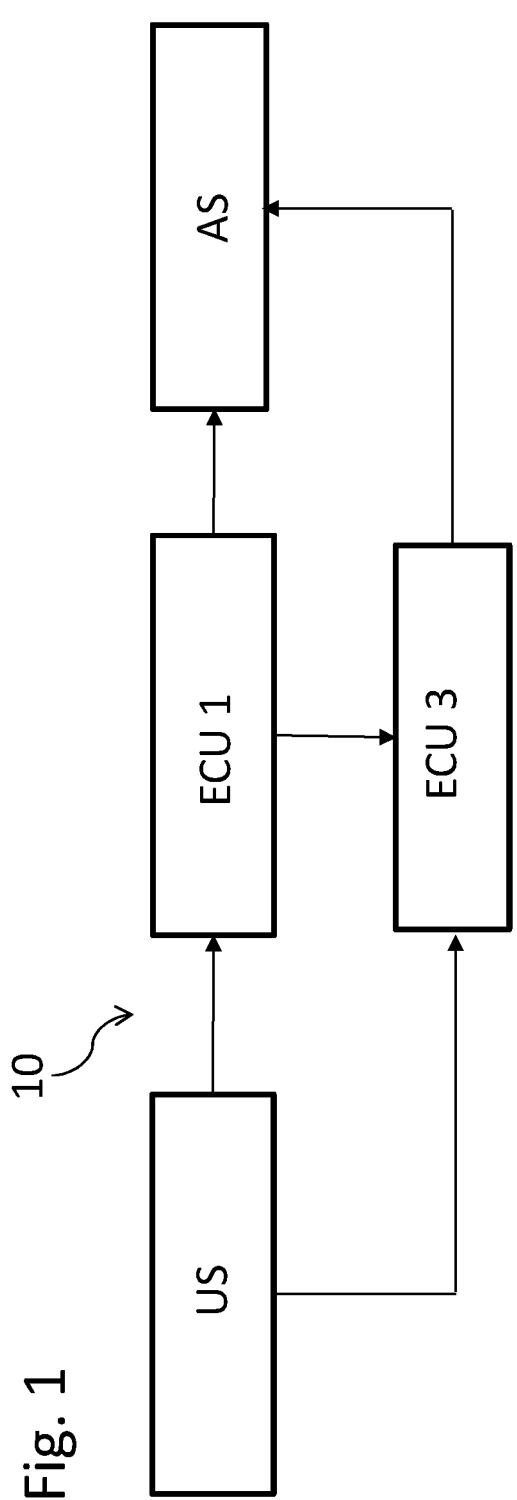
FIG. 1 and FIG. 2 show schematically and by way of example a control system for a motor vehicle.

FIG. 1 shows as an example a control system 10 for the autonomous driving operation of a motor vehicle with an environmental sensor system US, a first control unit ECU 1, an actuator controller AS and a control monitoring unit ECU 3.

In the example shown, the first control unit ECU 1 has a lower ASIL than the control monitoring unit ECU 3. Furthermore, the first control unit ECU 1 and the control monitoring unit ECU 3 are implemented by integrated circuits that are physically separated from one another. In the example shown, the first control unit ECU 1 and the control monitoring unit ECU 3 are supplied with electrical energy by a common energy source, but the control monitoring unit ECU 3 additionally has an emergency power battery, so that at least even temporary operation of the control monitoring unit ECU 3 is possible independently of the common energy source.

The environmental sensor system US acquires environmental data, which is required to determine control commands for the actuator controller AS of the vehicle, and transmits this data to the first control unit ECU 1. For example, the environmental sensor system US can register other road users, weather, light and carriageway conditions, and information about traffic signs and/or a vehicle position. The vehicle position can be acquired, for example, with a satellite navigation system. Furthermore, the environmental data can provide information, for example, about a currently used lane of a multilane carriageway or about a maximum permissible speed, which was acquired, for example, with the aid of a database and the satellite navigation system or with the aid of optical traffic sign recognition.

The environmental sensor system US can have optically recording sensors, in particular camera sensors, radar and/or lidar sensors, ultrasonic sensors and/or infrared sensors. A combination of said sensors is explicitly possible.

The first control unit ECU 1 determines control commands for the actuator controller AS with the environmental data and with current vehicle parameters.

Vehicle parameters can be, for example, a speed, an acceleration or a fuel reserve of the motor vehicle. Other vehicle parameters can be, for example, the external dimensions of the motor vehicle or the charge level of a motor vehicle battery. The first control unit ECU 1 is configured to access the current vehicle parameters, which are acquired by vehicle parameter sensors (not shown).

In the example shown, the actuator controller is a combined actuator controller for a plurality of motor vehicle actuators. In other embodiments, respectively separate actuator controllers, for example an acceleration or speed controller, a brake controller or a light controller of the vehicle, can be provided.

In the example shown, the first control unit ECU 1 determines at a regular interval of 0.5 seconds, based on the acquisition of the environmental sensor system US and current vehicle parameters of the motor vehicle, control commands for the actuator controller AS, which controls all actuators of the motor vehicle relevant for driving operation in the example shown. The driving operation of the motor vehicle is thus controlled autonomously by the first control unit ECU 1.

The control monitoring unit ECU 3 checks the first control unit ECU 1 at a regular interval of 1.5 seconds. To this end control monitoring unit ECU 3 determines in the example shown, using the environmental data of the environmental sensor system US and current vehicle parameters, whether the control commands determined by the first control unit ECU 1 are correct/plausible. This takes place in the example shown in that at least a portion of the control commands relevant for road safety that is determined by the first control unit ECU 1, is likewise determined by the control monitoring unit ECU 3, wherein this determination is carried out by the control monitoring unit ECU 3 independently of the first control unit ECU 1. The control monitoring unit ECU 3 then compares the self-determined control commands with the corresponding control commands that were determined by the first control unit ECU 1.

If the control commands of the first control unit ECU 1, which are relevant for the road-safe control of the vehicle, correspond at least substantially to the commands determined by the control monitoring unit ECU 3, the control monitoring unit ECU 3 does not intervene in the autonomous control of the motor vehicle by the first control unit ECU 1.

However, if the control commands of the first control unit ECU 1, which are relevant for the road-safe control of the vehicle, do not correspond to the commands determined by the control monitoring unit ECU 3, the control monitoring unit ECU 3 determines emergency control commands with the environmental data of the environmental sensor system US and current vehicle parameters and transmits these to the actuator controller AS. The actuator controller AS is configured to treat the emergency control commands of the control monitoring unit ECU 3 as a priority and, if the emergency control commands of the control monitoring unit ECU 3 conflict with the control commands of the first control unit ECU 1, always to execute the emergency control commands of the control monitoring unit ECU 3 as a priority. In other embodiments the first control unit ECU 1 is also deactivated by the control monitoring unit ECU 3.

The determination of emergency control commands by the control monitoring unit ECU 3 takes place in the example shown in the same interval rhythm as the determination of control commands by the first control unit ECU 1 previously (0.5 seconds).

Figure 2:
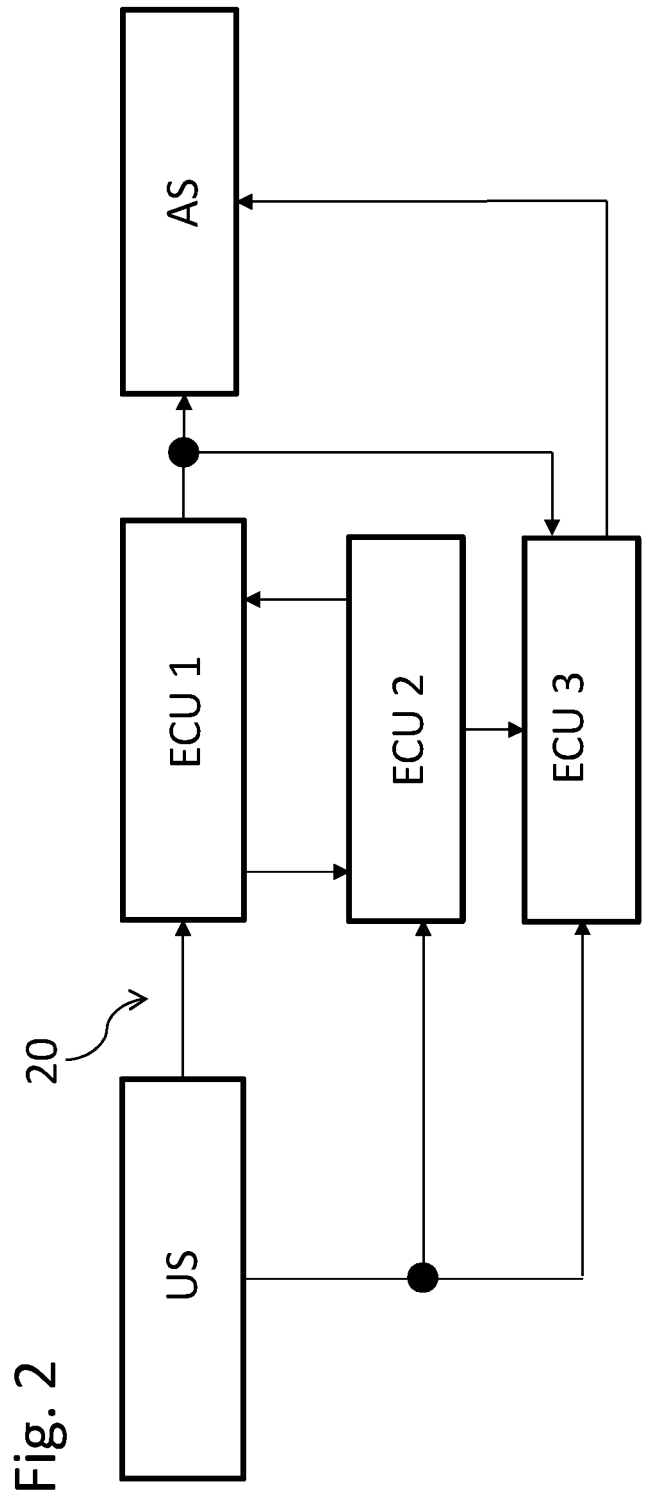

FIG. 2 shows by way of example a control system 20 for the autonomous driving operation of a motor vehicle with an environmental sensor system US, a first control unit ECU 1, a second control unit ECU 2, an actuator controller AS and a control monitoring unit ECU 3.

By analogy with the control system 10 shown in FIG. 1, the first control unit ECU 1 determines control commands for the actuator controller AS with the environmental data and with current vehicle parameters.

The second control unit ECU 2, which is formed with the first control unit ECU 1 physically by a common integrated circuit and has the same ASIL as ECU 1, autonomously determines a monitoring control command for each of the control commands determined by the first control unit ECU 1. The second control unit ECU 2 further compares each of the control commands determined by the first control unit ECU 1 with the monitoring control command respectively determined analogously. If the control commands deviate from one another by more than a predetermined tolerance, the control unit ECU 2 transmits fault information to the control monitoring unit ECU 3.

By analogy with the control system 10 shown in FIG. 1, the control monitoring unit ECU 3 also checks the first control unit ECU 1 at a regular interval of 1.5 seconds, by comparing a portion of the control commands issued to the actuator controller with self-determined commands. If the control monitoring unit ECU 3 determines a discrepancy when doing this or if the control unit ECU 2 transmits fault information to the control monitoring unit ECU 3, then the control monitoring unit ECU 3 determines emergency control commands with the environmental data of the environmental sensor system US and current vehicle parameters by analogy with the control system shown in FIG. 1 and transmits these to the actuator controller AS.

In a further development, the fault information transmitted by the second control unit ECU 2 can specify the nature of the discrepancy established between the control commands and the monitoring control commands and the control monitoring unit ECU 3 can effect different measures depending on the fault information, for example deactivation or the omission of deactivation of the first control unit ECU 1.

It is understood that the exemplary embodiments explained previously are not conclusive and do not restrict the subject matter disclosed here. In particular, it is evident to the person skilled in the art that he can combine the features described in any way with one another and/or can omit various features without thereby departing from the subject matter disclosed here.

The invention claimed is:

1. A control system for the autonomous control of a motor vehicle, comprising:
    an environmental sensor system, which is arranged and configured to acquire environmental data for the autonomous control of a motor vehicle;
    at least one actuator controller, which is configured to control at least one actuator of the motor vehicle;
    a first control unit, which is configured to determine control commands for the at least one actuator controller with the environmental data and to transmit these control commands to the at least one actuator controller;
    a control monitoring unit, which is configured to check a functionality of the first control unit with the environmental data and with the control commands transmitted to the actuator controller, wherein
    the control monitoring unit is further configured to determine emergency control commands for the at least one actuator controller with the environmental data, depending on the checking of the first control unit, and to transmit these emergency control commands to the at least one actuator controller, and
    the at least one actuator controller is further configured to execute the emergency control commands of the control monitoring unit prioritised over the control commands of the first control unit,
    wherein the control monitoring unit is further configured to use a first portion of the environmental data, which is used by the first control unit to determine the control commands, to determine the emergency control commands and to estimate by a numerical estimation method a second portion of the environmental data, which is used by the first control unit to determine the control commands, for determining the emergency control commands.

2. The control system according to claim 1, further comprising:
    at least a second control unit, which is configured to determine monitoring control commands with the environmental data, and
    to compare the determined monitoring control commands with the control commands determined by the first control unit for the at least one actuator controller, and depending on the comparison, to transmit fault information to the control monitoring unit.

3. The control system according to claim 2, wherein the first control unit is further configured to compare the control commands determined for the actuator controller with the monitoring control commands determined by the second control unit, and depending on the comparison, to transmit fault information to the control monitoring unit.

4. The control system according to claim 3, wherein the control monitoring unit is further configured to check a functionality of the second control unit with the environmental data and with the monitoring control commands, and/or
    depending on the checking of the second control unit, to deactivate the second control unit.

5. The control system according to claim 1, wherein the control monitoring unit is further configured to deactivate the first control unit depending on the checking of the first control unit.

6. The control system according to claim 1, wherein the control monitoring unit is further configured to deactivate the first or the second control unit depending on fault information transmitted by the first or second control unit.

7. The control system according to claim 1, wherein the first control unit and the second control unit are logical control units, which are formed physically by a common integrated circuit, and/or
    the control monitoring unit is logically and physically separate from the first and/or second control unit.

8. A control system for the autonomous control of a motor vehicle, comprising:
    an environmental sensor system, which is arranged and configured to acquire environmental data for the autonomous control of a motor vehicle;
    at least one actuator controller, which is configured to control at least one actuator of the motor vehicle;
    a first control unit, which is configured to determine control commands for the at least one actuator controller with the environmental data and to transmit these control commands to the at least one actuator controller;
    a control monitoring unit, which is configured to check a functionality of the first control unit with the environmental data and with the control commands transmitted to the actuator controller,
    at least a second control unit, which is configured to determine monitoring control commands with the environmental data, and
    to compare the determined monitoring control commands with the control commands determined by the first control unit for the at least one actuator controller, and
    depending on the comparison, to transmit fault information to the control monitoring unit wherein
    the control monitoring unit is further configured to determine emergency control commands for the at least one actuator controller with the environmental data, depending on the checking of the first control unit, and to transmit these emergency control commands to the at least one actuator controller, and
    the at least one actuator controller is further configured to execute the emergency control commands of the control monitoring unit prioritised over the control commands of the first control unit,
    wherein the second control unit is further configured to use a first portion of the environmental data, which is used by the first control unit to determine the control commands, to determine the monitoring control commands and to estimate by a numerical estimation method a second portion of the environmental data, which is used by the first control unit to determine the control commands, for determining the monitoring control commands.

9. The control system according to claim 1, wherein the first control unit is physically separated from the control monitoring unit.

10. The control system according to claim 1, wherein the control monitoring unit is configured to determine if the control commands determined by the first control unit are correct based on the environmental data.

* * * * *